Oct. 21, 1947.  C. A. DRINGMAN  2,429,405
KNIFE
Filed Aug. 15, 1939
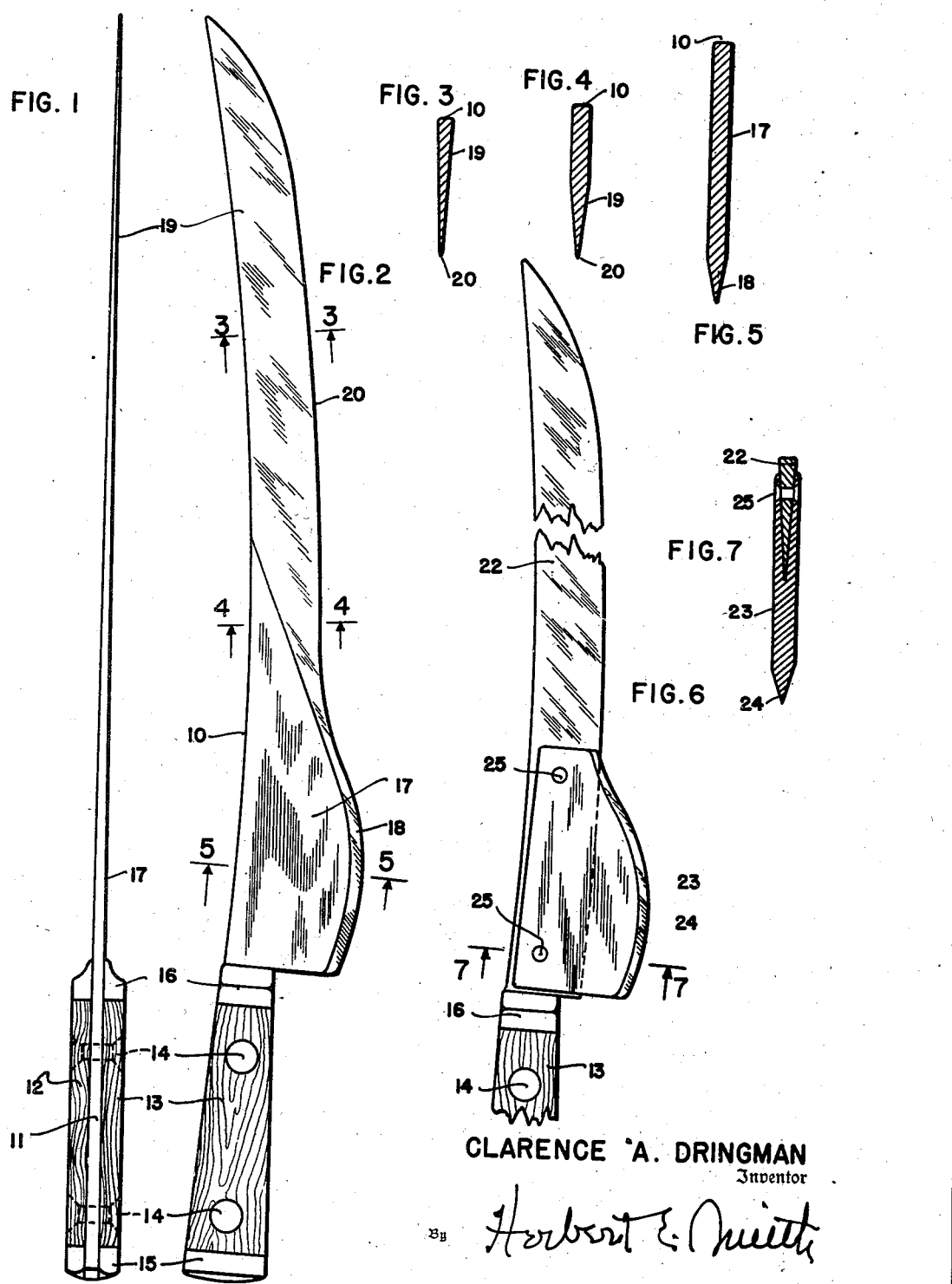
CLARENCE A. DRINGMAN
Inventor
By Herbert E. Smith
Attorney Patented Oct. 21, 1947

2,429,405

UNITED STATES PATENT OFFICE 2,429,405

KNIFE

Clarence A. Dringman, Lincoln, Wash.

Application August 15, 1939, Serial No. 290,216

Section 3, Public Law 690, August 8, 1946.
Patent expires August 15, 1959

4 Claims. (Cl. 30—353)

My present invention relates to improvements in a knife of the dual purpose type.

It is well known that in meat cutting and the butcher trade there are many occasions when slicing or cutting must be accompanied by a chopping; as, for example, when a chop is cut from the rack of meat the cutter must sever, generally, small pieces of bone, and that ordinarily in such an operation the meat cutter must first use a knife then lay the knife down in order to use a cleaver for cutting the bony or gristly part. The same is true in trimming the sides of cuts of meat.

It is an important object of my invention to provide a dual purpose knife which has features whereby an operator may slice and, with the same instrument, chop or cut.

Another object of the invention is to provide a knife of the dual purpose type which may be easily and cheaply manufactured.

A further object of the invention resides in the provision of a knife of the character described which may be sharpened with the usual knife "steel" and without the necessity of special sharpening equipment.

Still another object of the invention is the provision of means whereby, with but slight modification, the conventional slicing knife may be adapted as well for chopping operations.

Other objects and advantages of the invention will be apparent during the course of the following description.

In the accompanying drawings, forming a part of this specification, and in which like numerals are employed to designate like parts throughout the same, Figure 1 is an elevational view of the back edge of the knife of my invention, Figure 2 is a side elevational view of my knife, Figure 3 is a sectional view taken on lines 3—3 of Figure 2.

Figure 4 is a sectional view taken on lines 4—4 of Figure 2,

Figure 5 is a sectional view taken on lines 5—5 of Figure 2,

Figure 6 is an elevational view similar to Figure 2, showing the manner of adapting my invention to a conventional knife, with portions broken away for convenience of illustration, and Figure 7 is taken on line 7—7.

In the drawings, wherein for the purpose of illustration is shown a preferred embodiment of my invention, the numeral 10 designates a knife body having at one end a handle shank 11. At either side of the shank 11 handle halves 12 and 13 are secured by means of rivets 14—14. In accordance with the customary practice, an end ferrule 15 encloses the ends of the handle halves and provides a neat finish for the handle. On the forward end of the handle halves a guard ferrule 16 is also provided.

Just forward of the handle the body of the knife is provided with an enlarged arcuate blade 17 having a relatively abrupt cutting edge 18. The forward or slicing portion 19 of the knife has an edge 20, and the portion 19 is relatively thin and may be ground as desired for slicing and fine cutting. The thickness of the portion 19 is relatively thinner than the body portion 17 of the chopper blade, and the cutting edge 18 gradually decreases from an abrupt angle to the thin taper on the forward portion 19.

In the modified form shown in Figure 6 the customary handle 13, riveted at 14 to a handle shank and provided with a ferrule 16, has the conventional slicing blade 22. A chopping blade 23 having an abrupt cutting edge 24 is secured to the blade 22 by means of rivets 25—25, and the blade 23 would ordinarily be adapted to fit the sloping face of the blade 22 so that no sharp corner or cracks would be present, as shown in Figure 7.

In using such a knife the meat cutter of course grasps the handle in the usual manner, and in severing chops or steaks makes the conventional cuts for severing the chop from the body of the meat. When, on occasion, he encounters gristle or small bones, he merely swings on the obstacle with the cutting edge 18 and, because of the fact that the edge 18 is backed up by the heavy body portion 17, he will find it quite simple to make the desired break. The knife is particularly useful in sectioning chicken or other fowl as well.

In sharpening such a knife, the forward portion 19 may be ground or honed as usual, and with relative simplicity the body 17 may be ground by gradually increasing the angle of the knife to the grinding object to provide a neatly finished sharpened edge.

It is to be understood that the form of my invention, herewith shown and described, is to be taken as a preferred example of the same, and various changes in the shape, size and arrangement of parts may be resorted to, without departing from the spirit of my invention, or the scope of the subjoined claims.

Having thus fully described my invention, what I claim as new and desire to secure by Letters Patent is:

1. A knife comprising a blade body having a handle shank and handle halves secured thereon, said blade body being comparatively thick forward of the handle shank and having a decreasing taper to the tip, a broad chopping blade formed in the comparatively thick portion adjacent the handle and having an abruptly tapered convex cutting edge, a narrow slicing blade in the forward thin portion of the body and having a thin tapered cutting edge, the cutting edge of the chopping blade gradually decreasing in taper, and a convex curved edge portion between the broad chopping blade and the slicing blade whereby the chopping blade merges into the cutting edge of the slicing blade.

2. A knife comprising a blade body having a handle shank and handle halves secured thereon, a broad chopping blade formed in said body having an abruptly tapered convex cutting edge, a narrow slicing blade forward of the chopping blade and having a thin tapered cutting edge, the cutting edge of the chopping blade gradually decreasing in taper, and a concave curved edge portion between the chopping blade and the slicing blade whereby the chopping blade merges into the cutting edge of the slicing blade.

3. A knife comprising a handle, a broad convex chopping element adjacent the handle, having a cutting edge, a narrow cutting blade forward of the chopping element, and a concave curved edge portion merging the cutting edge of the chopping element with the blade.

4. A knife comprising a cutting blade with a cutting edge and having a handle, a broad convex chopping blade having a cutting edge and bifurcated in the edge opposite the cutting edge to fit the rear edge portion of the cutting edge of the cutting blade and secured thereto, said chopping blade having an abruptly tapered concave cutting edge portion merging with the cutting edge of the knife blade.

CLARENCE A. DRINGMAN.

REFERENCES CITED

The following references are of record in the file of this patent:

UNITED STATES PATENTS

| Number | Name | Date |
|---|---|---|
| D. 18,776 | Cox | Dec. 4, 1888 |
| 527,175 | Hurd | Oct. 9, 1894 |
| D. 25,047 | Collins | Jan. 14, 1896 |
| 583,682 | Ganzhorn | June 1, 1897 |
| D. 48,496 | Kovac | Feb. 1, 1916 |
| D. 57,683 | Lickert | Apr. 26, 1921 |
| 1,763,452 | Williamson | June 10, 1930 |
| 2,075,310 | Sprague | Mar. 30, 1937 |